United States Patent [19]

Bengtsson

[11] Patent Number: 5,064,207
[45] Date of Patent: Nov. 12, 1991

[54] SEALING RING FOR SEALING A PIPE JOINT

[75] Inventor: Christer Bengtsson, Värnamo, Sweden

[73] Assignee: Forsheda AB, Forsheda, Sweden

[21] Appl. No.: 629,066

[22] Filed: Dec. 14, 1990

Related U.S. Application Data

[63] Continuation of Ser. No. 301,505, Jan. 24, 1989, abandoned.

[30] Foreign Application Priority Data

Feb. 3, 1988 [SE] Sweden .................. 8800348

[51] Int. Cl.⁵ .................. F16J 15/02; F16L 21/02
[52] U.S. Cl. .................. 277/207 A; 277/227; 285/110; 285/231
[58] Field of Search .................. 277/207 A, 227, 124, 277/DIG. 2; 285/110, 231, 232

[56] References Cited

U.S. PATENT DOCUMENTS

| 4,097,076 | 6/1978 | Wackenreuther et al. | 277/207 A X |
| 4,173,362 | 11/1979 | Glover et al. | 277/207 A Y |
| 4,213,619 | 7/1980 | Arlt et al. | 277/207 A |
| 4,344,461 | 8/1982 | Brunt et al. | 277/207 A X |
| 4,566,704 | 1/1986 | Von Dongeren | 277/207 A |

FOREIGN PATENT DOCUMENTS

| 229647 | 10/1963 | Australia | 277/207 A |
| 1182913 | 12/1964 | Fed. Rep. of Germany . | |
| 1288994 | 2/1969 | Fed. Rep. of Germany | 285/110 |
| 1921956 | 11/1970 | Fed. Rep. of Germany | 277/207 A |
| 2151664 | 4/1973 | Fed. Rep. of Germany | 285/110 |
| 141001 | 11/1977 | Sweden . | |
| 406757 | 8/1966 | Switzerland | 285/110 |
| 940833 | 11/1963 | United Kingdom | 285/110 |
| 1181776 | 2/1970 | United Kingdom | 285/231 |

Primary Examiner—Allan N. Shoap
Attorney, Agent, or Firm—Jeffers, Hoffman & Niewyk

[57] ABSTRACT

A sealing ring for sealing in a pipe joint an annular space between a socket end and a spigot end introduced therein comprises an annular sealing portion (8) consisting of elastically yielding sealing material and a substantially annular reinforcing portion (10) consisting of a material which is rigid in relation to the elastically yieldable material, the sealing portion (8) and the reinforcing portion (10) being fixedly connected with each other at the connection surface (18). The outer surface (40) of the sealing ring has a surface portion which is of a shape corresponding to the shape of the connection portion as parallelly displaced in the axial direction of the ring. The invention also relates to a mould for manufacturing such a sealing ring by means of injection moulding.

7 Claims, 3 Drawing Sheets

SEALING RING FOR SEALING A PIPE JOINT

This is a continuation of U.S. Pat. application Ser. No. 07/301,505, filed Jan. 24, 1989, now abandoned.

The present invention relates to a sealing ring for sealing in a pipe joint an annular space between a socket end and a spigot end introduced therein. The invention also relates to a mould for manufacturing such a sealing ring by means of injection moulding.

A common type of pipe joint is established by introducing a spigot end of a first pipe end portion into a socket end of a second pipe end portion, the sealing between the outer surface of the spigot end and the inner surface of the socket end being provided by means of a sealing ring positioned in the annular space between said surfaces. Thereby, the sealing ring is usually positioned in an inner groove formed in the pipe socket. In thermoplastic material pipes the sockets at the pipe end portions necessary for the pipe jointing are usually formed by radially expanding the pipe wall. This is provided by heating the pipe end portion to a plastic condition whereupon the pipe end portion being in a softened condition is radially expanded by means of a mandrel which is introduced into the pipe end portion. It is usual to provide in the same operation the pipe end portion with a groove for receiving the sealing ring intended for the sealing of the joint between the socket end and the spigot end introduced therein.

According to a recently developed method the operation for forming the socket at the pipe end portion and positioning a sealing ring in a locked-in position in the socket in one single step is conducted by positioning the sealing ring on the mandrel before the mandrel is introduced into the softened pipe end portion and moving the softened pipe end portion over the mandrel as well as the sealing ring positioned thereon, the sealing ring being retained in the socket for constituting a sealing ring at a later jointing operation after the pipe end portion has been cooled off and has solidified and after the mandrel has been withdrawn from the socket thus formed.

In order to make it possible to provide the moulding around the sealing ring positioned on the mandrel and a secure retaining of the sealing ring in the groove formed in the socket the sealing ring comprises in addition to the elastically yieldable sealing material a reinforcing portion consisting of a relatively rigid material. It is realized that there exist several difficult problems as to the establishment of a connection between the sealing portion and the reinforcing portion, cooperation between the sealing portion and the reinforcing portion in the pipe joint and perhaps above all an efficient manufacturing of sealing rings consisting of two different materials. The object of the present invention is to provide a sealing ring which is improved in the above respects and a mould for manufacturing such a sealing ring by means of injection moulding.

In order to comply with this object the sealing ring according to the invention comprises an annular sealing portion consisting of an elastically yieldable sealing material and a substantially annular reinforcing portion consisting of a material which is rigid in relation to the elastically yieldable material and is at a connection surface fixedly connected with the sealing portion, the sealing ring being characterized in that the portion of the outer surface of the sealing ring, which is positioned axially opposite to the connection surface is of a shape corresponding to the shape of the connection surface as parallelly displaced in the axial direction of the ring.

A preferred sealing ring according to the invention has an outer sealing portion positioned radially outside the connection surface for sealing against the inner surface of the socket end and preferably against the inner surface of a groove formed therein and has an inner sealing surface positioned radially inside the connection surface for sealing against the outer surface of the socket end, the outer and the inner sealing portions being connected with each other by means of a connection portion which is fixedly connected with the reinforcing portion at the connection surface and at the side thereof axially opposite to the connection surface presents the surface portion having a shape corresponding to the shape of the connection surface as parallelly displaced in the axial direction of the ring.

A sealing ring according to the invention can be manufactured in a convenient way by injection moulding without requiring any displacement of the sealing ring in the mould.

The invention is described in the following with reference to the accompanying drawings.

Figure 1:
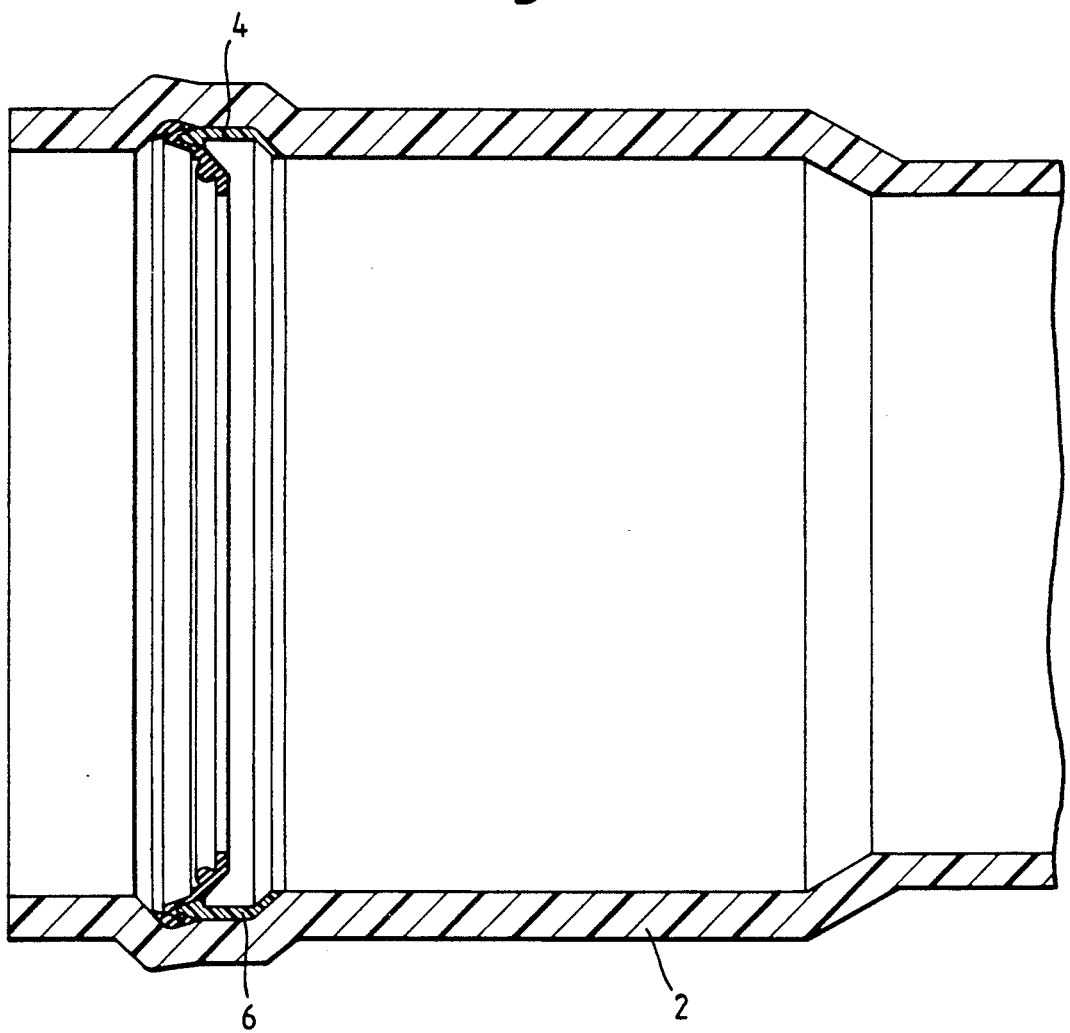
FIG. 1 is an axial section of a pipe socket provided with a sealing ring according to the invention.

In FIG. 1 there is shown an axial section of the socket end portion 2 of a polyvinyl chloride pipe having a sealing ring 6 according to the invention in a locked-in position in an inner groove 4. The main portions of the sealing ring 6 are a sealing portion 8 and a reinforcing portion 10.

The socket end portion 2 with the locked-in sealing ring 6 has preferably been provided according to a method known per se by simultaneously manufacturing the pipe end portion 2 and forming the pipe end portion around the sealing ring 6. According to a previously known method this is provided by positioning the sealing ring 6 on a mandrel and pushing a heated, softened pipe end portion in the axial direction over the mandrel and the sealing ring positioned thereon. Thereby the pipe end portion is expanded to form the socket end portion 2 including the groove 4, the sealing ring 6 being positioned in the groove. After the pipe end portion has been cooled and solidified and the socket thus formed has been withdrawn from the mandrel with the sealing ring 6 retained in the groove 4 in the socket the pipe socket as shown in FIG. 1 has been manufactured. Because of the fact that the sealing ring 6 is provided with the reinforcing portion 10 the sealing ring 6 is in a locked-in position in the groove 4.

When the socket end portion 2 is connected with a spigot end the spigot end is in a conventional way introduced into the pipe end portion 2, the sealing ring 6 thereby sealing the annular space between the pipe end portion and the spigot end.

Figure 2:
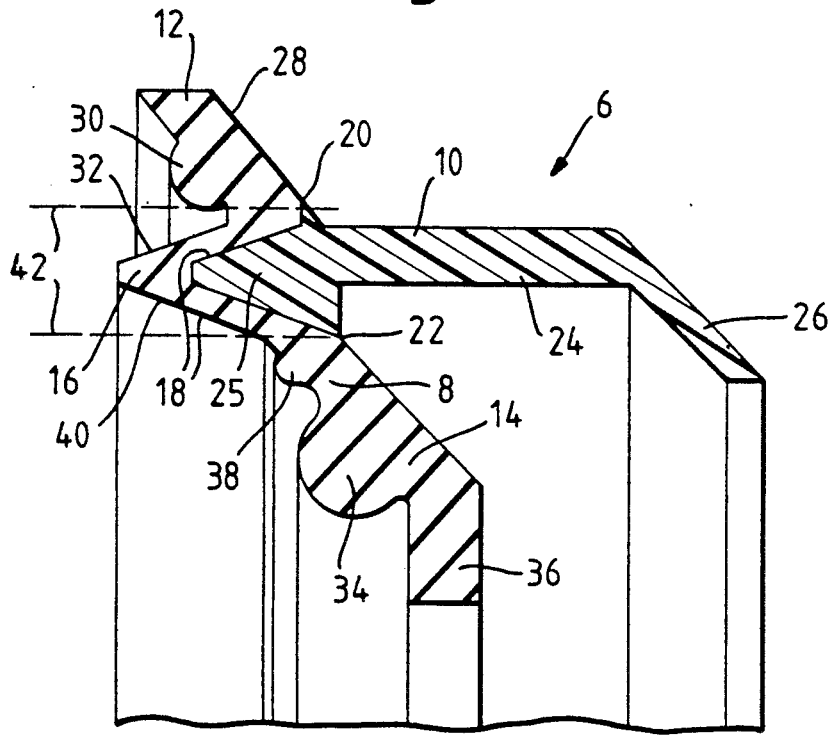
FIG. 2 is an axial section of the sealing ring shown in FIG. 1 on an enlarged scale.

In FIG. 2 the sealing ring 6 is shown on an enlarged scale in the position taken by the ring before the ring is positioned in the groove 4 of the socket end portion 2. As mentioned, the main portions of the sealing ring 6 are constituted by the sealing element or portion 8 and the reinforcing element or portion 10. The sealing portion 8 consists of an elastically yieldable sealing material, for example rubber, and comprises an outer sealing portion 12, an inner sealing portion 14 and a connection portion 16 positioned between the outer sealing portion and the inner sealing portion. As appears from the figures the outer sealing portion, the inner sealing portion and the connection portion constitute one single unitary element. At the connection portion 16 the sealing portion 8 is fixedly connected with the reinforcing portion 10 along a connection surface 18 extending between a radially outer line 20 and a radially inner line 22.

The reinforcing portion 10 consists of a material which is relatively rigid in relation to the material of the sealing portion 8, preferably a plastic material. The reinforcing portion 10 consists of a substantially cylindrical central portion 24, a pointed edge portion 25 the outer surface of which is connected with the connection portion 16 of the sealing portion 8, and an obliquely inwards directed, thinner edge portion 26. The edge portion 26 is provided with axial slots (not shown) making it possible radially to expand the edge portion 26 to some extent.

The outer sealing portion 12 of the sealing portion 8 extends obliquely outwards in such a way that the outer surface 28 thereof is contacted by the end edge of the socket end portion and is folded downwards to the position shown in FIG. 1 when the socket end portion 2 is being formed around the sealing ring. In this position a bead 30 at the inner surface of the sealing portion 2 engages an opposite conical surface 32 of the connection portion 16. The bead 30 provides the compression of the sealing portion 12 necessary for a reliable sealing at the same time as the required stability is provided by the fact that the portion of the connection portion 16 on which the surface 32 is provided is supported by the projecting edge portion 25 of the reinforcing portion 10.

The tightness of the connection between the sealing ring and the socket is further maintained by the fact that the outer edge of the outer sealing portion 12 forms a sealing lip.

As appears from FIGS. 1 and 2 the inner sealing portion 14 extends in its relaxed position obliquely inwards into the socket end portion 2. When a spigot end is introduced into the socket end portion 2 the edge of the spigot end contacts the inner sealing portion 14 which is thereby turned in the direction of the central portion 24 of the reinforcing portion 10. Because of the fact that the sealing portion 14 is provided with a compression bead 34 there is provided the required compression of the sealing portion 14 between the reinforcing portion 10 and the outer surface of the spigot end for providing the desired tightness. As appears from the drawings the sealing ring 14 is at the introduction of the spigot end into the socket and portion 2 received in an inwardly open groove formed by the edge portions 25 and 26 and the central portion 24 of the reinforcing portion 10 providing for correct positioning and compression of the sealing portion 14.

At the transition between the connection portion 16 and the inner sealing portion 14 the sealing portion 8 has a reinforcing area formed by a bead 38.

Because of its constructional features the sealing ring according to the invention is adapted to be manufactured by injection moulding in an especially advantageous way. The advantageous manufacturing technique is provided mainly because of the fact that the outer surface of the sealing ring at the portion 40 thereof which is positioned between the broken lines 42 exactly corresponds to a surface portion which is provided by axially and in parallel displacing the connection surface 18 to the left in FIG. 2. The advantage thereof will more evidently appear in connection with the following description of the manufacturing of the sealing ring in the mould shown in FIGS. 3-5.

Figure 3:
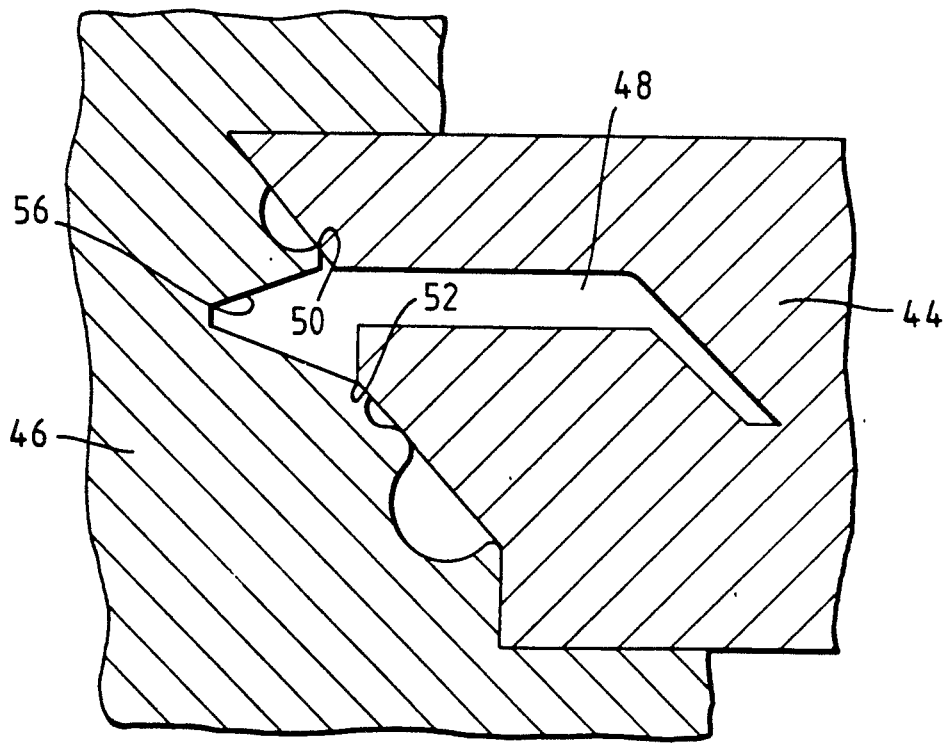
FIG. 3-5 show in three different steps the manufacturing of a sealing ring according to the invention by means of a mould according to the invention.

A mould for injection moulding a sealing ring according to the invention basically consists of two mould portions 44 and 46. The mould portions are in a limited extension displaceable in relation to each other in a direction coinciding with the axial direction of the sealing ring. As shown in FIG. 3 the mould portions are in a closed position for defining a mould space 48 for the injection moulding of the reinforcing portion 10. It appears that there is a sealing engagement between the mould portions 44 and 46 along the lines 50 and 52 which means that the material which is injected into the mould space 48 cannot arrive to the open spaces positioned outside the lines 50 and 52.

Figure 4:
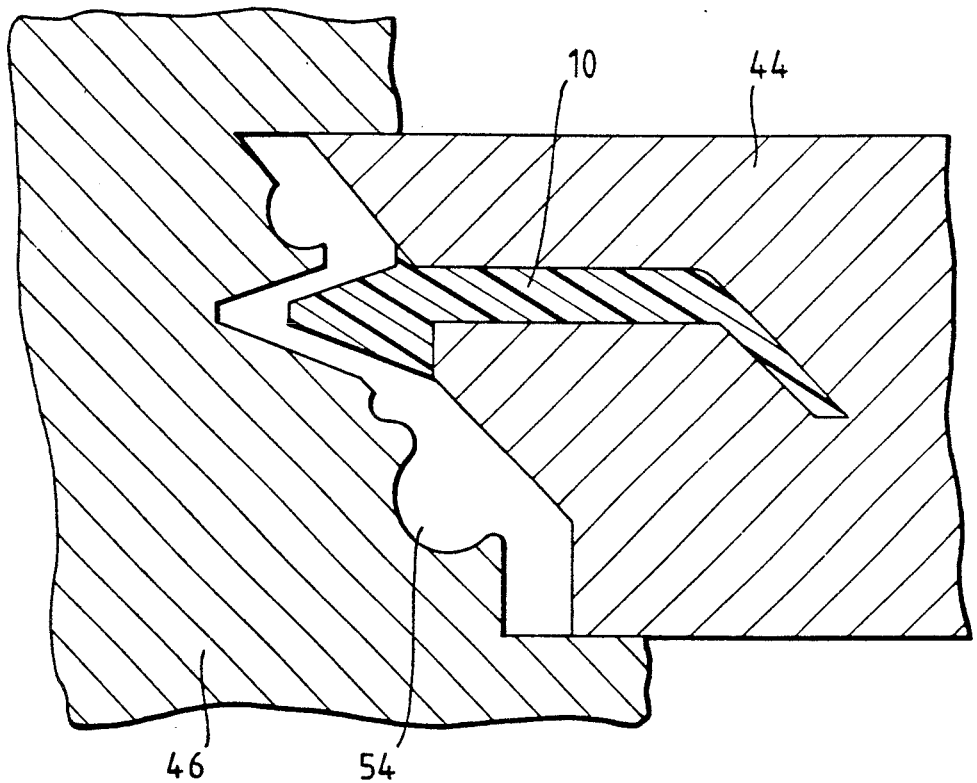
Figure 5:
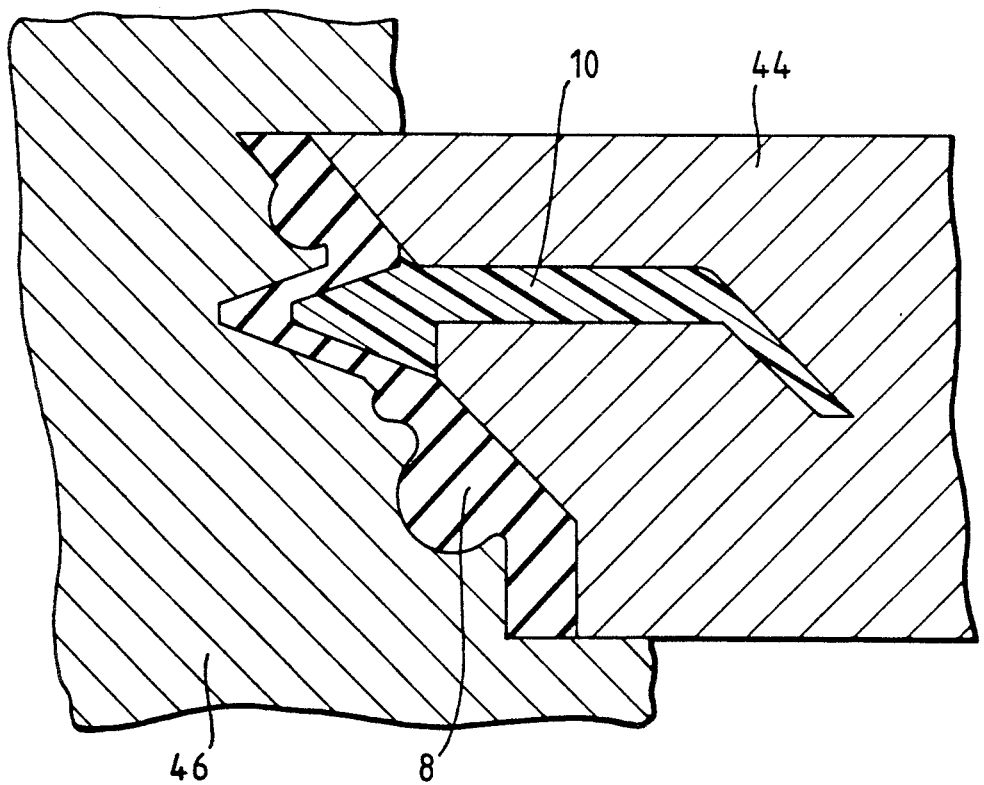

After the injection of the material which is intended to constitute the reinforcing portion 10 into the mould space 48 and after this material has partly cured the mould portions 44 and 46 are separated to the position shown in FIG. 4. Thereby there is provided a mould space 54 for forming the sealing portion 8 of the sealing ring. Thus, the surface portion 56 of the mould portion 46 which has formed the edge portion 25 of the reinforcing portion 10 will be used for forming the outer surface of the edge portion 25 as well as for forming a corresponding, outer surface portion of the connection portion 16 of the sealing portion 8. When the material which shall form the sealing portion 8 is injected into the mould space 54 there is provided a binding of the sealing portion 8 to the reinforcing portion 10 at the connection surface 18. After the vulcanisation of the sealing portion 8 the sealing ring 6 has been completed.

The described design of the sealing ring 6 according to the invention makes it possible to manufacture the sealing ring consisting of two components without the requirement of moving the component first moulded in the mould. It is recognized that this provides for a substantial reduction of the manufacturing time and a substantial improvement of the tolerances in the manufacturing of the ring.

The invention can be modified within the scope of the following claims. For example it is of course possible to divide the mould portion 46 into cylindrical planes parallel with the axis of the sealing ring so that the mould surface 56 which forms the surface portions of the sealing ring which are parallelly displaced in relation to each other can be displaced differently long distances from the original position making it possible to deviate from exact correspondence between the connection surface and the corresponding outer surface portion of the sealing ring while maintaining the advantages of the invention.

I claim:

1. A sealing ring for sealing a pipe joint in an annular space between a socket end and a spigot end introduced therein, comprising:
   an annular sealing element; and
   a substantially annular reinforcing element, said sealing element being of an elastically yieldable sealing material and said reinforcing element being of a material which is rigid in relation to the elastically yieldable sealing material;
   said sealing element including a connection portion having an inner connection surface;

said reinforcing element including an outer connection surface being fixedly connected with said inner connection surface;

said connection surfaces forming a connection interface therebetween, said sealing element connection portion having an axially outer surface that is congruent with said outer connection surface of said reinforcing element and is axially displaced from said connection surface of said reinforcing element a distance equal to the axial thickness of said sealing element connection portion at said inner connection surface, whereby the axially outer surface of said sealing element connection portion and the outer connection surface of said reinforcing element can be injection moulded by means of a single mould cavity surface;

said sealing element further including one of an inner and outer sealing portion connected to said connection portion and extending generally in a radial direction relative to said connection portion for sealing against a surface of a pipe joint.

2. A sealing ring as claimed in claim 1, wherein said sealing portion is an outer sealing portion positioned radially substantially outside the reinforcing element connection surface for sealing against a radially inner surface of the socket end of a pipe joint.

3. A sealing ring as claimed in claim 1, wherein said sealing portion is an outer sealing portion positioned radially substantially outside the reinforcing element connection surface for sealing against a radially outer surface of the spigot end of a pipe joint.

4. A sealing ring as claimed in claim 3, including an outer sealing portion connected to said connection portion and positioned radially substantially outside the reinforcing element connection surface for sealing against a radially inner surface of the socket end of a pipe joint, and said connection portion of said sealing element is fixedly connected with said reinforcing element at said connection surfaces.

5. A sealing ring as claimed in claim 4, wherein the inner sealing portion, when the sealing ring is positioned in the socket end portion but before the spigot end has been introduced therein, extends obliquely inward into the pipe socket and is adapted to be compressed between the radially outer surface of the spigot end and a corresponding radially inner surface of the reinforcing element when the spigot end is introduced into the pipe socket.

6. A sealing ring as claimed in claim 5, wherein a radially inner surface of the reinforcing element forms a groove in which the inner sealing portion is adapted to be partially received.

7. A sealing ring as claimed in claim 4, wherein the outer sealing portion is adapted to be compressed between the radially inner surface of the socket end and an opposite, obliquely extending surface of a section of the connection portion supported by the reinforcing element when the sealing ring is positioned in the socket end.

* * * * *

UNITED STATES PATENT AND TRADEMARK OFFICE
CERTIFICATE OF CORRECTION

PATENT NO. : 5,064,207
DATED : November 12, 1991
INVENTOR(S) : Christer Bengtsson It is certified that error appears in the above-identified patent and that said Letters Patent is hereby corrected as shown below:

Claim 3, column 5, line 30, delete "outer" and substitute therefor --inner--.

Claim 3, column 5, line 31, delete "outside" and substitute therefor --inside--.

Signed and Sealed this

Twenty-third Day of March, 1993

*Attest:*

STEPHEN G. KUNIN

*Attesting Officer*   Acting Commissioner of Patents and Trademarks